United States Patent [19]

Takato

[11] Patent Number: 5,689,373
[45] Date of Patent: Nov. 18, 1997

[54] EYEPIECE LENS

[75] Inventor: Hideyasu Takato, Tokyo, Japan

[73] Assignee: Olympus Optical Co., Ltd., Tokyo, Japan

[21] Appl. No.: 587,382

[22] Filed: Jan. 17, 1996

[30] Foreign Application Priority Data

Jan. 19, 1995 [JP] Japan .................................. 7-006554

[51] Int. Cl.$^6$ .............................. G02B 25/00; G02B 3/02; G02B 17/00; G02B 9/00
[52] U.S. Cl. ..................... 359/646; 359/647; 359/718; 359/726; 359/796
[58] Field of Search ....................... 359/646, 647, 359/718, 726, 796

[56] References Cited

U.S. PATENT DOCUMENTS

| 3,508,811 | 4/1970 | Yoshida | 359/718 |
| 5,136,427 | 8/1992 | Sugawara | 359/646 |
| 5,191,477 | 3/1993 | Abe et al. | 359/695 |
| 5,225,927 | 7/1993 | Nozaki et al. | 359/355 |
| 5,313,327 | 5/1994 | Ito et al. | 359/646 |

FOREIGN PATENT DOCUMENTS 0560162  3/1944  United Kingdom ............. 359/718

*Primary Examiner*—David C. Nelms
*Assistant Examiner*—Evelyn A. Lester
*Attorney, Agent, or Firm*—Kenyon & Kenyon

[57] ABSTRACT

An eyepiece lens of the present invention and is arranged in a real image mode finder optical system consists essentially of a single positive meniscus lens convex on the object side having an object side surface and a pupil side surface, each of which is aspherical. This invention provides a compact eyepiece lens having a long optical path length from an image plane to the eyepiece lens, a large diameter of the exit pupil and a short focal length.

11 Claims, 4 Drawing Sheets

EYEPIECE LENS

BACKGROUND OF INVENTION

1. Field of the Invention

The present invention generally relates to an eyepiece lens applied to a finder or the like for a single-lens reflex camera, or a compact camera with a lens shutter.

2. Description of the Related Art

Among conventional eyepiece lenses, the simplest eyepiece lens consists of a single positive lens.

An image formed by a photographic optical system or an objective lens system is inverted vertically and horizontally with respect to an object to be photographed. Therefore, it is necessary to provide an optical member (e.g., a prism or a mirror) between an image plane and an eyepiece lens for correcting the inverted image to an erect image. Hence, it is necessary to define a long optical path length between the image plane and the eyepiece lens for providing a space for positioning the optical member.

Thus, a positive meniscus lens is generally used as the single positive lens for the eyepiece systems, since it is capable of arranging the principal point toward the object side more than a double-convex lens does.

However, the conventional eyepiece systems having the positive meniscus lens and the long optical path length intend to provide a poor aberration correction. Therefore, in such eyepiece systems, it is necessary to provide aspherical surfaces on the object and pupil sides of the positive meniscus lens for correcting an aberration.

Japanese Laid-Open Patent Application Publication No. Hei 4-204619 discloses such an eyepiece system for a single-lens reflex camera. Japanese Laid-Open Patent Application Publication Nos. Hei 3-139606 and Hei 4-230719 disclose such eyepiece systems applied to a real image mode finder for a compact camera with a lens shutter.

However, the diameters of the exit pupils of the eyepiece lenses in the above Japanese Laid-Open Patent Applications are small, that is, 4 mm so that a photographer cannot easily look at the object through the eyepiece lens when the eyepiece system is applied to a finder optical system. Further, the focal length of the eyepiece lenses are so long that the finder optical system cannot be designed to be compact. Such eyepiece lenses are disadvantageous for designing a finder having a large magnification.

SUMMARY OF THE INVENTION

Object of the Invention

It is a general object of the present invention to provide an eyepiece lens for defining a long optical path length from an image plane to the eyepiece lens, a large diameter of a pupil, and a short focal length for its compact design.

Features of the Present Invention

In keeping with the object, a first feature of the present invention resides, briefly stated, in an eyepiece lens for observing an image formed by an objective lens and correctly erected by a correctly erect image forming system, the eyepiece lens consisting essentially of a positive meniscus lens convex on the object side, wherein the positive meniscus lens has an object side surface and a pupil side surface, each of which is aspherical, and wherein the eyepiece lens is configured so as to satisfy the following condition (1):

$$-1 \times 10^{-3} < X_1/f < 0 \tag{1}$$

where f is the focal length of the eyepiece lens, and $x_1$ is the amount of displacement of the object side surface of the eyepiece lens from its reference sphere at a height of 0.12f from its optical axis.

Thus, in the eyepiece lens of the present invention, the normalized aspherical value $X_1/f$ of the object side surface of the positive meniscus lens satisfies the above condition (1) so that spherical aberration and coma can be properly corrected. Moreover, if the normalized aspherical value $X_1/f$ of the positive meniscus lens satisfies the above condition (1), even if the diameter of the exit pupil of the positive meniscus lens is 5 mm, the spherical aberration can be properly corrected and also coma-flare can be controlled.

If the normalized aspherical value exceeds the lower limit of $-1 \times 10^{-3}$ of condition (1), it is so small that the spherical aberration in high orders cannot be corrected. If the normalized aspherical value exceeds the upper limit of 0 of condition (1), the spherical aberration cannot be corrected and also the coma-flare cannot be properly corrected.

A second feature of the present invention is to provide an eyepiece lens for observing an image formed by an objective lens and correctly erected by a correctly erect image forming system, the eyepiece lens consisting essentially of a positive meniscus lens convex on the object side, wherein the positive meniscus lens has an object side surface and a pupil side surface, each of which is aspherical, and wherein the eyepiece lens is configured so as to satisfy the following condition (2):

$$5 < f/A < 12 \tag{2}$$

where f is the focal length of the eyepiece lens, and A is the radius of the exit pupil of the eyepiece lens.

The above condition (2) defines a range of the ratio of the focal length to the radius for designing a compact finder using the eyepiece lens.

If the ratio exceeds the lower limit of 5 of condition (2), the focal length will be too short. Therefore, when making each unit of the finder, its manufacturing error causes a substantially low optical performance of the finder even if the error is small. If the ratio exceeds the upper limit of 12 of condition (2), when trying to maintain the same exit angle of the eyepiece lens, the height of an intermediate image will be large. Therefore, a finder using this eyepiece lens is not suitable for a compact design.

Another feature of the invention is to provide an eyepiece lens system having the first or second feature and satisfying the following condition (3):

$$1 \times 10^{-4} < X_2/f < 5 \times 10^{-2} \tag{3}$$

where f is the focal length of the positive meniscus lens, and $X_2$ is the amount of displacement of the pupil side surface of the positive meniscus lens from its reference sphere at a height of 0.17f from the optical axis.

The above condition (3) relates to the normalized aspherical value $X_2/f$ of the positive meniscus lens on the pupil side and represents a condition for correcting spherical aberration and a coma, as condition (1). Especially, it is preferable to satisfy the above condition (3) for correcting the coma properly.

If the normalized aspherical value $X_2/f$ exceeds the lower limit of $1 \times 10^{-4}$ of condition (3), it will be difficult to correct the comma. Especially, it is almost impossible to correct the coma around the periphery of both surfaces of the positive meniscus lens. If the normalized aspherical value exceeds the upper limit of $5 \times 10^{-2}$ of condition (3), the normalized aspherical value will be too large. Therefore, the spherical aberration and the coma cannot be properly corrected even if the normalized aspherical value satisfies the above condition (1).

Further, concerning the paraxial radius of curvature of the object side surface of the positive meniscus lens, it is preferable that the eyepiece lens system of the present invention satisfies the following condition (4):

$$0.3 < r/f < 0.6 \tag{4}$$

where f is the focal length of the positive meniscus lens.

If the ratio r/f exceeds the lower limit of 0.3 of condition (3), the radius of curvature is too small to correct an aberration. Further, the principal point will be too close to the exit pupil to define a long optical path length from the image plane to the positive meniscus lens. If the ratio r/f exceeds the upper limit of 0.6 of condition (4), positive distortion will be large and it is not preferable.

Further, in order to correct properly astigmatism in the eyepiece lens system of the present invention, concerning the thickness of the positive meniscus lens, caused it is preferable to satisfy the following condition (5):

$$0.05 < d/f < 0.3 \tag{5}$$

where f is the focal length of the positive meniscus lens.

If the ratio d/f exceeds the lower limit of 0.05 of condition (5), a large amount of astigmatism is generated. If the ratio d/f exceeds the upper limit of 0.3 of condition (5), a curvature of field will be large so that the difference of diopter depending on the field angle will be large and it is not preferable.

Still further, in the eyepiece lens of the present invention, spherical aberration and coma can be more properly corrected if the normalized aspherical value $X_1/f$ satisfies the following condition (1'):

$$-5 \times 10^{-4} < X_1/f < 0 \tag{1'}$$

If the normalized aspherical value $X_1/f$ satisfies the above condition (1'), the spherical aberration and the coma can be balanced and easily corrected so that the eyepiece lens can be further improved in optical performance.

DETAILED DESCRIPTION OF THE PREFERRED EMBODIMENTS

An eyepiece lens according to examples 1–3 of the present invention will now be explained with reference to the accompanying drawings.

EXAMPLE 1

Figure 1:
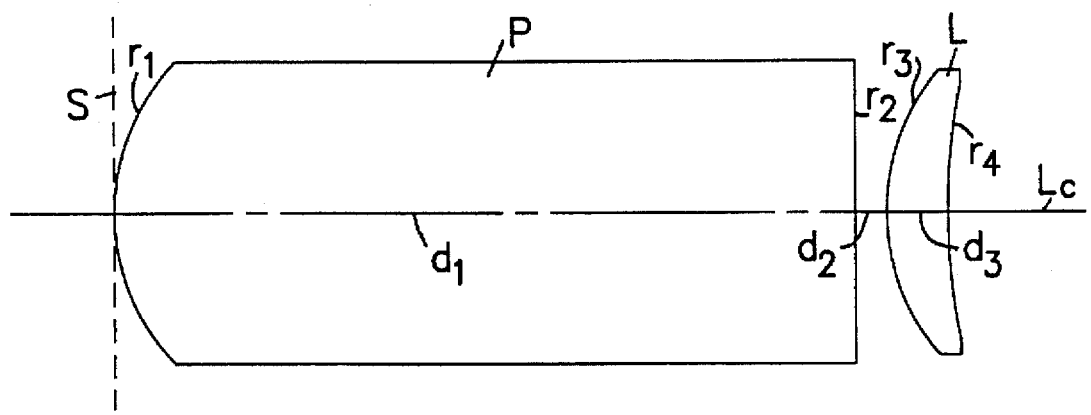
FIG. 1 is a sectional view along the optical axis which shows a structure of a real image mode eyepiece system of a finder optical system using an eyepiece lens of a first example of the present invention.

FIG. 1 is a sectional view along the optical axis which shows a structure of a real image mode eyepiece lens system of a finder optical system using an eyepiece lens of a first embodiment of the present invention. In FIG. 1, S is an image plane where an image is formed by an objective lens (not shown), P is a prism which can invert an image, L is an eyepiece lens of the present example, and $L_c$ is an optical axis. The eyepiece lens L is convex on the object side (not shown, left side of FIG. 1), and has an object side surface and a pupil side surface, each of which is aspherical. The prism P has an incident plane $r_1$ which serves as a field lens.

The following numerical data are parameters of the lens and prism in the eyepiece system of the finder in FIG. 1:

List of Parameters $d_0$: the distance (mm) from the image plane S to the incident plane of the prism P.
ER: the distance (mm) from the rearmost surface to the eye point.
f: the focal length (mm) of the eyepiece lens system.
D: the diopter.
$\omega$: the half field angle.
$r_1, r_2, \ldots$: the radii of curvature of individual lens surfaces.
$d_1, d_2, \ldots$: the thickness of individual lenses or spaces.
$n_1, n_2, \ldots$: the refractive indices of individual lenses.
$v_1, v_2, \ldots$: Abbe's numbers of individual lenses.

List of Numerical Data $d_0=0$
ER=18.5
f=21
D=−0.5
$\omega$=11.2°
$r_1$=9.321
   $d_1$=30  $n_1$=1.52542  $v_1$=55.78
$r_2$=∞
   $d_2$=1.5
$r_3$=9.832 (aspherical)
   $d_3$=2.6  $n_3$=1.49241  $v_3$=57.66
$r_4$=146.581 (aspherical)

The following numerical data are parameters of the conic constant represented by κ and the aspherical coefficients of fourth, sixth and eighth orders represented by E, F and G, respectively.

Third Surface

κ=1
E=−0.27327×$10^{-3}$  F=0.16976×$10^{-4}$
G=−0.17798×$10^{-6}$

Fourth Surface $\kappa=1$
$E=-0.89668\times10^{-3}$ $F=0.20135\times10^{-4}$
$G=-0.23439\times10^{-6}$ The following numerical data are parameters of conditions (1), (2), (3), (4) and (5).

$X_1/f=-3.314\times10^{-4}$
$f/A=0.84$
$X_2/f=9.967\times10^{-4}$
$r/f=0.468$
$d/f=0.124$

EXAMPLE 2

Figure 2:
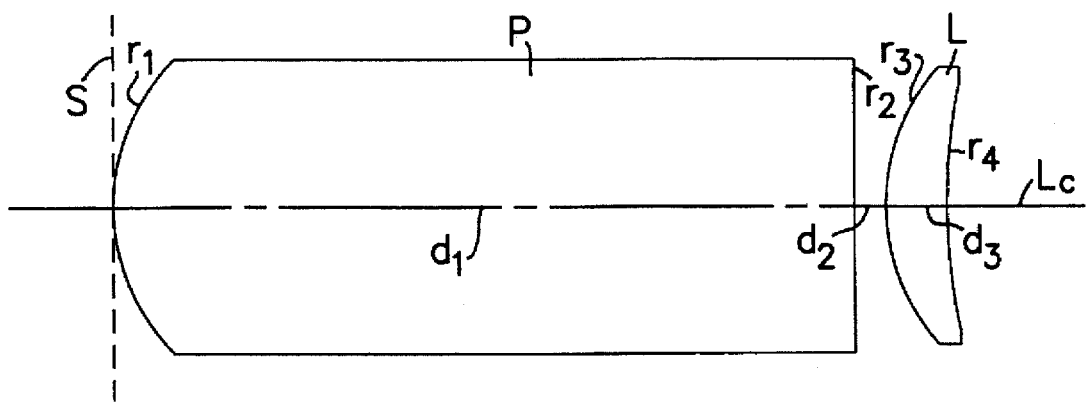
FIG. 2 is a sectional view along the optical axis which shows a structure of a real image mode eyepiece system of a finder optical system using an eyepiece lens of a second example of the present invention.

FIG. 2 is a sectional view along the optical axis which shows a structure of a real image mode eyepiece system of a finder optical system using an eyepiece lens of a second example of the present invention. In FIG. 2, S is an image plane where an image is formed by an objective lens (not shown), P is a prism which can invert an image, L is an eyepiece lens of the present example, and $L_c$ is an optical axis. The eyepiece lens L is convex on the object side (not shown, left side of FIG. 2), and has an object side surface and a pupil side surface, each of which is aspherical. The prism P has an incident plane $r_1$ which serves as a field lens.

The following numerical data are parameters of the lens and prism in the eyepiece system of the finder in FIG. 2:

List of Parameters $d_0$: the distance (mm) from the image plane S to the incident plane of the prism P.
ER: the distance (mm) from the rearmost surface to the eye point.
f: the focal length (mm) of the eyepiece lens system.
D: the diopter.
$\omega$: the half field angle.
$r_1, r_2, \ldots$: the radii of curvature of individual lens surfaces.
$d_1, d_2, \ldots$: the thickness of individual lenses or spaces.
$n_1, n_2, \ldots$: the refractive indices of individual lenses.
$\nu_1, \nu_2, \ldots$: Abbe's numbers of individual lenses.

List of Numerical Data $d_0=0$
$ER=18.5$
$f=21$
$D=-0.5$
$\omega=11.1°$
$r_1=8.786$
  $d_1=31$ $n_1=1.52542$ $\nu_1=55.78$
$r_2=\infty$
$d_2=1.5$
$r_3=8.299$ (aspherical)
  $d_3=3.7$ $n_3=1.49241$ $\nu_3=57.66$
$r_4=34.002$ (aspherical)

The following numerical data are parameters of the conic constant represented by $\kappa$ and the aspherical coefficients of fourth, sixth and eighth orders represented by E, F and G, respectively.

Third Surface $\kappa=1.0914$
$E=-0.46486\times10^{-4}$ $F=0.30691\times10^{-5}$
$G=0.60497\times10^{-7}$

Fourth Surface $\kappa=0.9985$
$E=0.30154\times10^{-3}$ $F=0.67635\times10^{-5}$
$G=0.18613\times10^{-6}$ The following numerical data are parameters of conditions (1), (2), (3), (4) and (5).

$X_1/f=-4.762\times10^{-6}$
$f/A=0.84$
$X_2/f=3.246\times10^{-3}$
$r/f=0.395$
$d/f=0.176$

EXAMPLE 3

Figure 3:
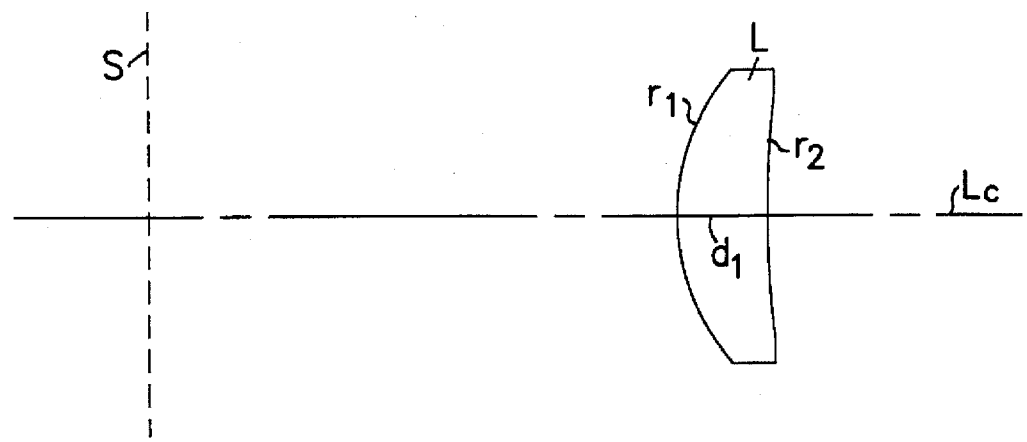
FIG. 3 is a sectional view along the optical axis which shows a structure of an eyepiece lens of a third example of the present invention.

FIG. 3 is a sectional view along the optical axis which shows a structure of an eyepiece lens of a third example. In FIG. 3, S is an image plane where an image is formed by an objective lens (not shown), L is an eyepiece lens, and $L_c$ is an optical axis. The eyepiece lens L is convex on the object side (not shown, left side of FIG. 3), and has an object side surface and a pupil side surface, each of which is aspherical.

The following numerical data are parameters of the eyepiece lens of this example:

List of Parameters $d_0$: the distance (mm) from the image plane S to the incident plane of the prism P.
ER: the distance (mm) from the rearmost surface to the eye point.
f: the focal length (mm) of the eyepiece lens system.
D: the diopter.
$\omega$: the half field angle.
$r_1, r_2$: the radii of curvature of individual lens surfaces.
$d_1$: the thickness of the eyepiece lens.
$n_1$: the refractive index of the eyepiece lens.
$\nu_1$: Abbe's number of the eyepiece lens.

List of Numerical Data $d_0=20.8$
$ER=18.5$
$f=21$
$D=-0.5$
$\omega=10.7°$
$r_1=10.267$ (aspherical)
  $d_1=3.5$ $n_1=1.49241$ $\nu_1=57.66$
$r_2=1278.109$ (aspherical)

The following numerical data are parameters of the conic constant represented by m and the aspherical coefficients of fourth, sixth, eighth and tenth orders represented by E, F, G and H, respectively.

First Surface $\kappa=1$
$E=-0.29525\times10^{-3}$ $F=0.38578\times10^{-4}$
$G=-0.13778\times10^{-5}$ $H=0.22386\times10^{-7}$

Second Surface $\kappa=1$
$E=-0.16575\times10^{-3}$ $F=0.56487\times10^{-4}$
$G=-0.25469\times10^{-5}$ $H=0.51092\times10^{-7}$ The following numerical data are parameters of conditions (1), (2), (3), (4) and (5).

$X_1/f = -1.924 \times 10^{-4}$
$f/A = 0.84$
$X_2/f = 4.469 \times 10^{-3}$
$r/f = 0.489$
$d/f = 0.167$ The configurations of aspherical surfaces in each example are expressed by the following equation using aspherical coefficients:

$$X = CY^2/\{1+(1-\kappa C^2 Y^2)^{1/2}\} + EY^4 + FY^6 + GY^8 + HY^{10}$$

where X is the coordinates in the direction of the optical axis, Y is the coordinates in the direction normal to the optical axis, and C is the curvature (=1/r) at the vertex of the spherical surface.

Thus, since the eyepiece lens, according to the present invention, is composed of a single positive meniscus lens having an object side surface and a pupil side surface, each of which is aspherical, the eyepiece lens is capable of correcting caused aberrations properly, being compact, and having a large diameter of the exit pupil, and a short focal distance. Also, the optical path length from the image plane to the eyepiece lens can be long.

Figure 4:
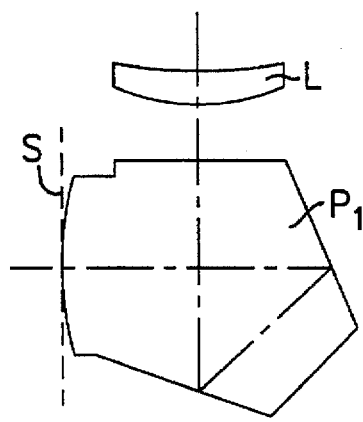
FIG. 4 is a sectional view along the optical axis which shows a structure of a pentagonal roof prism as a prism using with an eyepiece lens of the present invention.
Figure 5:
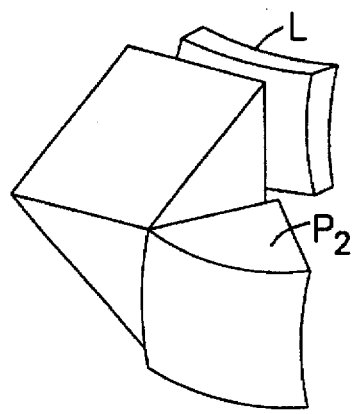
FIG. 5 is a perspective view which shows a structure of a Porro prism as a prism used with an eyepiece lens of the present invention.

FIG. 4 is a sectional view along the optical axis which shows a structure of a pentagonal roof prism as a prism used with the eyepiece lens of the present invention. FIG. 5 is a sectional view along the optical axis which shows a structure of a Porro prism as a prism using with an eyepiece lens of the present invention.

The eyepiece lens of the present invention is can be optimally applied to the finder of a single reflex lens camera as well as to the finder of a compact camera.

Figure 6:
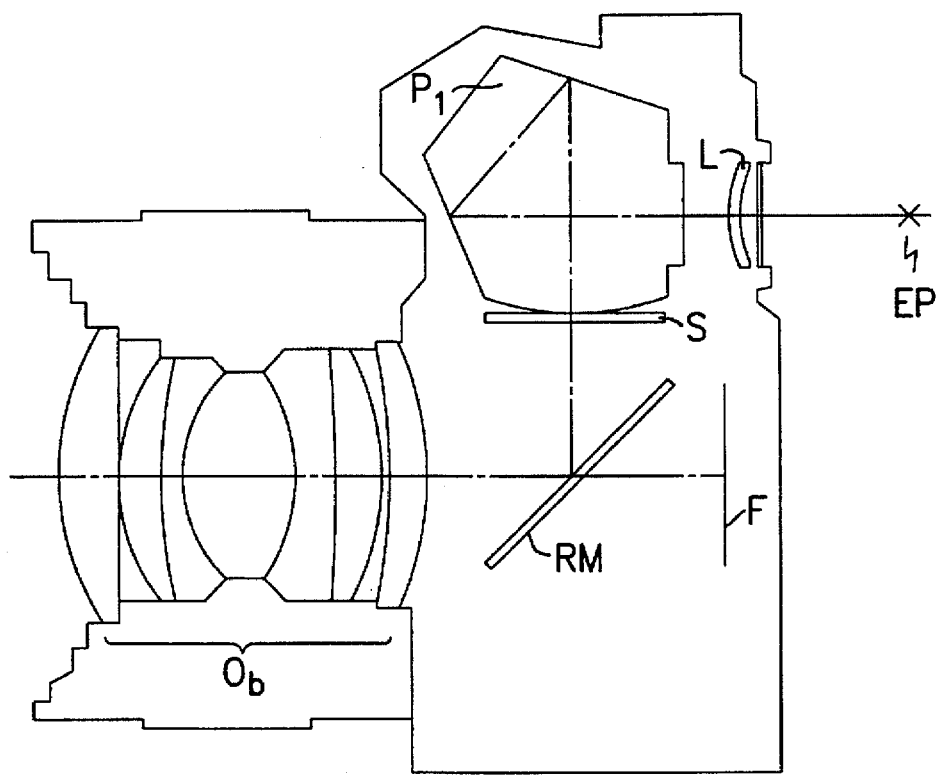
FIG. 6 is a sectional view along the optical axis which shows an example of a single lens reflex camera using an eyepiece lens of the present invention for its finder.

FIG. 6 shows an example of a single lens reflex camera using the eyepiece lens of the present invention for its finder.

The single reflex lens camera takes a photograph by focusing light from an object to be photographed (not shown) by an objective lens $O_b$ to form an image on a film F. A quick-return mirror RM is retreatably arranged between the photographic objective lens $O_b$ and the film F. In order to aim at the object and determine the picture composition before photographing, the image of the object is formed by the photographic objective lens $O_b$ on the image plane S through a quick-return mirror RM internally inserted in the optical path. The image of the object formed on the image plane S is magnified and observed at the position of an eye point EP through the pentagonal prism $P_1$ and the eyepiece lens L of the present invention.

Figure 7:
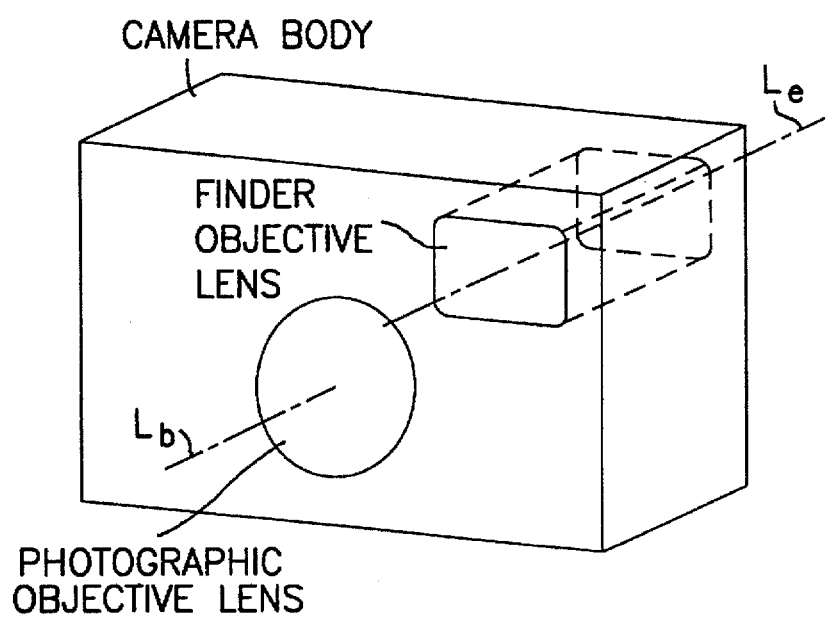
FIG. 7 is a perspective view which shows an example of a compact camera using an eyepiece lens of the present invention for its finder.
Figure 8:
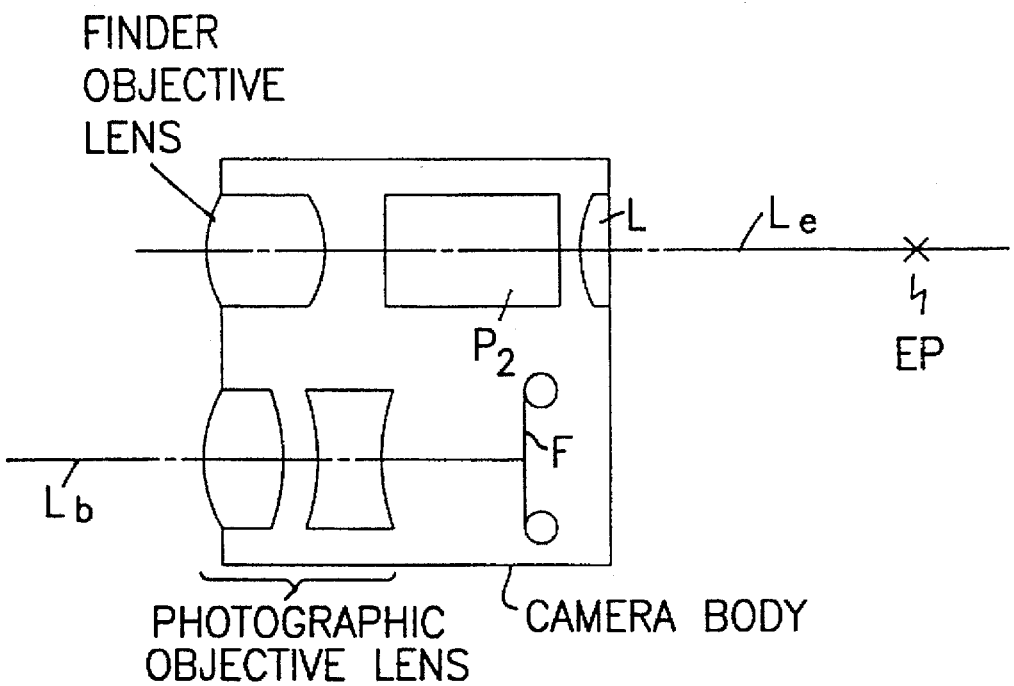
FIG. 8 is a sectional view along the optical axis which shows an example of a compact camera using an eyepiece lens of the present invention for its finder.

FIGS. 7 and 8 are a perspective view and a sectional view along the optical axis, respectively, which show a compact camera using the eyepiece lens of the present invention as its finder. Thus, the eyepiece lens L of the present invention also can be used optimally for a finder of a compact camera. In FIG. 7 and FIG. 8, $L_b$ is a photographic optical path, and $L_e$ is a finder optical path. The photographic optical path $L_b$ and the finder optical path $L_e$ are arranged in parallel. The image of the object is observed by a finder comprising the finder objective lens, an image-erecting prism $P_2$, an aperture stop, and the eyepiece lens L of the present invention, and formed on a film F by a photographic objective lens. The image-erecting prism is a Porro prism, a pentagonal roof prism or the like.

Figure 9:
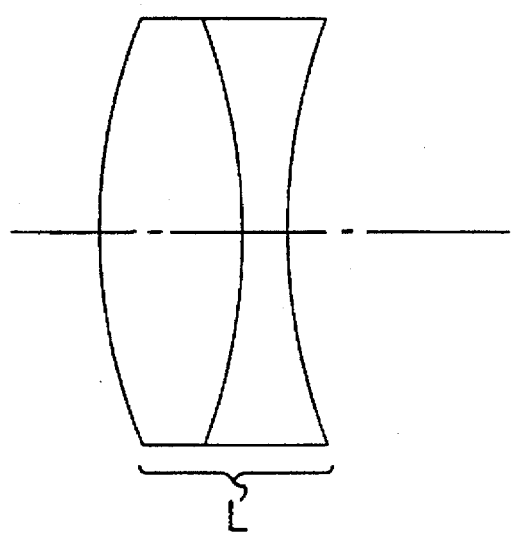
FIG. 9 is a sectional view along the optical axis which shows a cemented double lens.

Instead of using a single lens as the eyepiece lens the eyepiece lens of the present invention may be a cemented doublet as shown in FIG. 9.

As stated above, since the eyepiece lens of the present invention is composed a positive meniscus lens having an object side surface and a pupil side surface, each of which is aspherical, the eyepiece lens has a plurality of advantage points such as a large diameter of an exit pupil, a long optical path length from an image plane to the eyepiece lens, and a proper correction of caused aberrations.

I claim:

1. An eyepiece lens for observing an image formed by an objective lens and correctly erected by a correctly erect image forming system, the eyepiece lens consisting essentially of a positive meniscus lens convex on the object side, wherein the positive meniscus lens has an object side surface and a pupil side surface, each of which is aspherical, and wherein the eyepiece lens is configured so as to satisfy the following condition (1):

$$-1 \times 10^{-3} < X_1/f < 0 \quad (1)$$

where f is the focal length of the eyepiece lens, and $X_1$ is the amount of displacement of the object side surface of the eyepiece lens from its reference sphere at a height of 0.12f from its optical axis, wherein the diameter ⌀ of the exit pupil of the eyepiece lens satisfies the following condition:

$$⌀ \geq 5 \text{ (mm)}.$$

2. An eyepiece lens for observing an image formed by an objective lens and correctly erected by a correctly erect image forming system, the eyepiece lens consisting essentially of a positive meniscus lens convex on the object side, wherein the positive meniscus lens has an object side surface and a pupil side surface, each of which is aspherical, and wherein the eyepiece lens system is configured so as to satisfy the following condition (2):

$$5 < f/A < 12 \quad (2)$$

where f is the focal length of the eyepiece lens, and A is the radius of the exit pupil of the eyepiece lens.

3. An eyepiece lens according to claim 1 satisfying the following condition (3):

$$1 \times 10^{-4} < X_2/f < 5 \times 10^{-2} \quad (3)$$

where f is the focal length of the eyepiece lens, and $X_2$ is the amount of displacement of the pupil side surface of the eyepiece lens from its reference sphere at a height of 0.17f from its optical axis.

4. An eyepiece lens according to claim 1, wherein the eyepiece lens is arranged on the pupil side of a pentagonal prism so as to observe an image erected by the pentagonal prism.

5. An eyepiece lens according to claim 1, wherein the eyepiece lens is arranged on a pupil side of a Porro prism so as to observe an image erected by the Porro prism.

6. An eyepiece lens according to claim 1, wherein the eyepiece lens is composed of a single cemented doublet lens.

7. An eyepiece lens according to claim 2 satisfying the following condition (3):

$$1 \times 10^{-4} < X_2/f < 5 \times 10^{-2}$$

where f is the focal length of the eyepiece lens, and $X_2$ is the amount of displacement of the pupil side surface of the eyepiece lens from its reference sphere at a height of 0.17f from its optical axis.

8. An eyepiece lens according to claim 2, wherein the eyepiece lens is arranged on a pupil side of a pentagonal prism so as to observe an image erected by the pentagonal prism.

9. An eyepiece lens according to claim 2, wherein the eyepiece lens is arranged on a pupil side of a Porro prism so as to observe an image erected by the Porro prism.

10. An eyepiece lens according to claim 2, wherein the diameter ø of the exit pupil of the eyepiece lens satisfies the following condition:

$$ø \geq 5 \text{ (mm)}$$

11. An eyepiece lens according to claim 2, wherein the eyepiece lens is composed of a single cemented doublet lens.

* * * * *